United States Patent
Ishii et al.

(10) Patent No.: US 7,714,046 B2
(45) Date of Patent: May 11, 2010

(54) PROCESS FOR PRODUCING CRYSTAL NUCLEATOR COMPOSITION AND CRYSTALLINE POLYMER COMPOSITION

(75) Inventors: Manabu Ishii, Saitama (JP); Naoshi Kawamoto, Saitama (JP); Etsuo Tobita, Saitama (JP)

(73) Assignee: Adeka Corporation, Tokyo (JP)

( * ) Notice: Subject to any disclaimer, the term of this patent is extended or adjusted under 35 U.S.C. 154(b) by 67 days.

(21) Appl. No.: 12/088,726

(22) PCT Filed: Aug. 24, 2006

(86) PCT No.: PCT/JP2006/316561
§ 371 (c)(1),
(2), (4) Date: Mar. 31, 2008

(87) PCT Pub. No.: WO2007/039997
PCT Pub. Date: Apr. 12, 2007

(65) Prior Publication Data
US 2009/0156744 A1   Jun. 18, 2009

(30) Foreign Application Priority Data
Sep. 30, 2005   (JP)   ............................. 2005-288183

(51) Int. Cl.
C08K 5/00   (2006.01)
(52) U.S. Cl. .................. 524/108; 524/117; 524/394; 524/399; 525/150; 525/445; 549/1; 558/83
(58) Field of Classification Search ................ 524/108, 524/394, 399, 117; 525/150, 445; 549/216; 554/1; 558/83
See application file for complete search history.

(56) References Cited

U.S. PATENT DOCUMENTS

| | | | |
|---|---|---|---|
| 6,184,275 B1 * | 2/2001 | Takahashi et al. | 524/117 |
| 7,442,735 B2 * | 10/2008 | Tobita et al. | 524/108 |
| 2003/0054161 A1 | 3/2003 | Forte et al. | |
| 2003/0125432 A1 * | 7/2003 | Yukino et al. | 524/136 |
| 2003/0236329 A1 * | 12/2003 | Kawamoto et al. | 524/136 |
| 2005/0031886 A1 | 2/2005 | Forte et al. | |

FOREIGN PATENT DOCUMENTS

| | | |
|---|---|---|
| EP | 1 676 874 | 7/2006 |
| EP | 1 881 018 | 1/2008 |
| EP | 1 887 044 | 2/2008 |
| JP | 2-178341 | 7/1990 |
| JP | 3058487 | 4/2000 |
| JP | 2001-026666 | 1/2001 |
| JP | 2002-38820 | 11/2002 |
| JP | 2003-012868 | 1/2003 |
| JP | 2003-313444 | 11/2003 |
| JP | 2003-335968 | 11/2003 |
| JP | 2004-83852 | 3/2004 |
| JP | 3606400 | 10/2004 |
| JP | 2005-054036 | 3/2005 |
| WO | 00/15018 | 3/2000 |
| WO | WO 2005/012413 * | 2/2005 |

OTHER PUBLICATIONS

Machine translation of JP 2003-265975 [online], accessed via the internet [retrieved on Jul. 30, 2009], URL: <http://www19.ipdl.inpit.go.jp/PA1/cgi-bin/PA1DETAIL>.*
Machine translation of JP 2003-313444 [online], accessed via the internet [retrieved on Jul. 30, 2009], URL: <http://www19.ipdl.inpit.go.jp/PA1/cgi-bin/PA1DETAIL>.*
Database WPI Week 200433 Thomson Scientific, London, GB; AN 2004-351427 XP002522114 & JP 2004 094041 A (Fuji Xerox Co Ltd) dated Mar. 25, 2004.
European Patent Office issued a European Search Report dated Apr. 1, 2009, Application No. 06 78 2965.

* cited by examiner

*Primary Examiner*—David Wu
*Assistant Examiner*—Robert Jones, Jr.
(74) *Attorney, Agent, or Firm*—Young & Thompson

(57) ABSTRACT

The present invention provides a process for producing a crystal nucleator composition comprising; a first step pulverizing 95% by mass or more of a crystal nucleator ingredient containing one or two or more kinds of specific compounds to a primary particle diameter of 0.8 μm or smaller with a dry medium-stirring type pulverizer; and a second step mixing and pulverizing the pulverized crystal nucleator ingredient obtained in the previous step and a metal aliphatic carboxylate ingredient containing one or two or more kinds of specific metal aliphatic carboxylates. Also provided is a crystalline polymer composition comprising a crystal nucleator composition obtained by the production process

20 Claims, 1 Drawing Sheet

[Fig. 1]
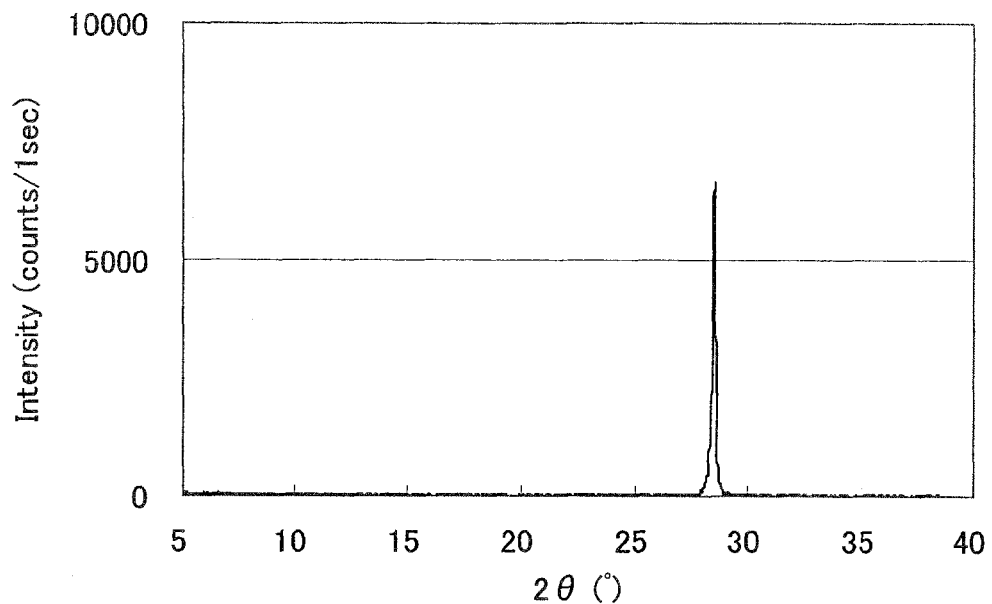
[Fig. 2]
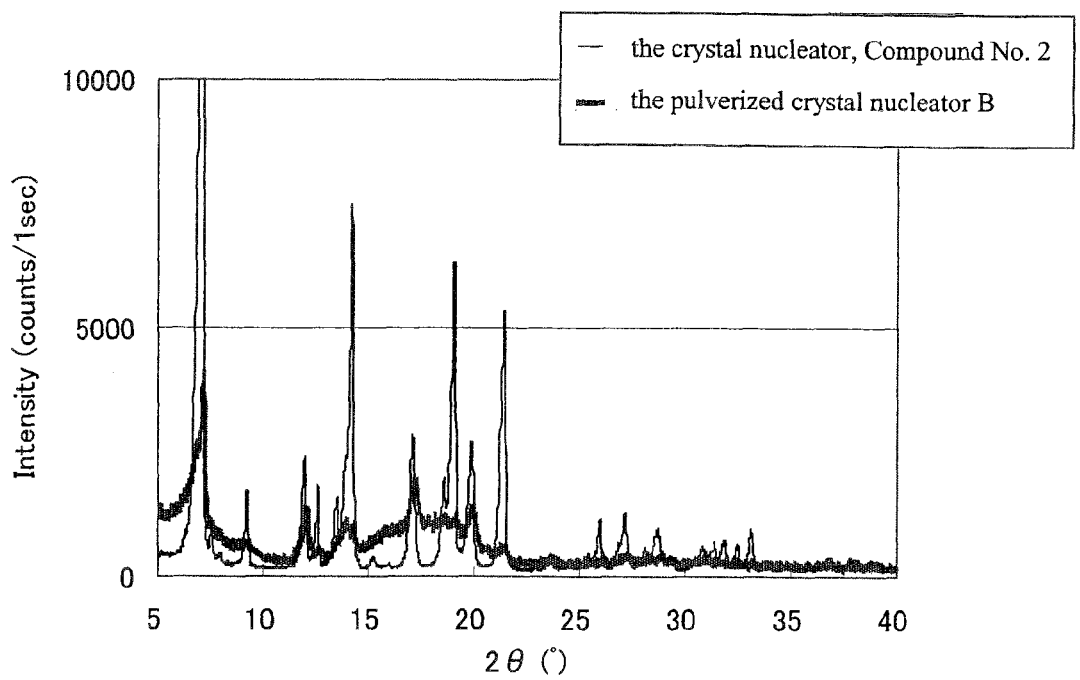

PROCESS FOR PRODUCING CRYSTAL NUCLEATOR COMPOSITION AND CRYSTALLINE POLYMER COMPOSITION

TECHNICAL FIELD

The present invention relates to a process for producing a crystal nucleator composition, and a crystalline polymer composition containing the crystal nucleator composition and exhibiting improved transparency thereof.

BACKGROUND ART

Crystalline polymers represented by polyolefin-based polymers are used widely as films, sheets, structural parts, or the like, because of their excellent moldability, thermal stability, and low specific gravities. However, transparency of the molded articles of the crystalline polymers is not necessarily good.

It is known that this defect arises from the crystallizing property of the crystalline polymer and that transparency of the crystalline polymer is improved by addition of a crystal nucleator, whereby the crystallizing temperature of the crystalline polymer is raised and crystallization thereof is accelerated to form fine crystals.

As the crystal nucleators, there are used, for example, a metal carboxylate such as sodium benzoate, aluminum 4-tert-butylbenzoate, sodium adipate, disodium bicyclo[2.2.1]heptane-2,3-dicarboxylate; a metal salt of phosphate ester such as sodium bis(4-tert-butylphenyl)phosphate and sodium 2,2'-methylene-bis(4,6-di-tert-butylphenyl)phosphate; a polyalcohol derivative such as dibenzylidene sorbitol, bis(methylbenzylidene) sorbitol, and bis(dimethylbenzylidene) sorbitol; and the like.

Among these compounds, especially, a metal salt of cyclic phosphate ester typified by 2,2'-methylene-bis(4,6-ditert-butylphenyl)phosphate exhibits a great effect in improving the properties of crystalline polymer material such as mechanical characteristics and transparency. Patent Documents 1 to 6 disclose that by using a metal aliphatic carboxylate together with the metal salt of cyclic phosphate ester, even better effect is obtained. Furthermore, Patent Documents 3 to 6 disclose that a crystalline polymer material added with a co-pulverized mixture containing a metal salt of cyclic phosphate ester which is a crystal nucleator ingredient and a metal aliphatic carboxylate exhibits an effect specifically in improving transparency.

Furthermore, to prevent the coagulation of crystal nucleator, Patent Documents 7 and 8 disclose a method in which the crystal nucleator, a metal salt of cyclic phosphate ester, is supported on the surface of inorganic material. Also, Patent Document 9 discloses a method of preventing the coagulation of inorganic fine particles, in which inorganic fine particles and inorganic pigments are mixed and pulverized together with a wet pulverizer to give inorganic fine particles supported on the surface of inorganic pigments.

As described above, various methods have been proposed to improve the effect of crystal nucleator in imparting transparency and the dispersibility of fine particles. However, as regards the metal salt of cyclic phosphate ester used as a crystal nucleator, the methods described above do not provide sufficient results and there still remain the following problems.

With the production methods described in Patent Documents 3 to 6, in which the crystal nucleator is co-pulverized with a metal aliphatic carboxylate, there is a problem that the pulverized material sticks together in the pulverizing vessel to lower productivity. There is also a problem that many fisheyes are formed in a crystalline polymer material containing the crystal nucleator to damage the appearance of a polymer. Regarding the production methods described in Patent Documents 7 to 9, there are problems that a drying step of pulverized material is necessary because the methods involve a wet pulverizing step, and moreover, it is difficult to obtain the effect of pulverization because pulverized material reaggregates upon drying.

Patent Document 1: Japanese Patent No. 3058487
Patent Document 2: Japanese Patent Laid-Open Publication No. 2002-338820
Patent Document 3: Japanese Patent Laid-Open Publication No. 2003-313444
Patent Document 4: Japanese Patent Laid-Open Publication No. 2003-335968
Patent Document 5: Japanese Patent Laid-Open Publication No. 2004-083852
Patent Document 6: Japanese Patent Laid-Open Publication No. 2005-054036
Patent Document 7: Japanese Patent Laid-Open Publication No. 2001-026666
Patent Document 8: Japanese Patent Laid-Open Publication No. 2003-012868
Patent Document 9: Japanese Patent No. 3606400

DISCLOSURE OF THE INVENTION

Problems to be Solved by the Invention

Accordingly, an object of the present invention is to provide a process for producing, with an extremely high productivity, a crystal nucleator composition having a sufficient transparency-imparting effect and to provide a crystalline polymer composition containing the obtained crystal nucleator composition, exhibiting improved transparency and having reduced fisheye formation.

Means for Solving the Problems

The present inventors have conducted intensive studies and found that the problems can be solved by a process which has a first step pulverizing a crystal nucleator ingredient with a dry medium-stirring type pulverizer and a second step mixing and pulverizing the pulverized material obtained in the previous step and a metal aliphatic carboxylate together.

The present invention has been made based on the above findings and provides a process for producing a crystal nucleator composition comprising a first step pulverizing 95% by mass or more of a crystal nucleator ingredient containing one or two or more kinds of compounds represented by the following general formula (I) to a primary particle diameter of 0.8 μm or smaller with a dry medium-stirring type pulverizer, and a second step mixing and pulverizing the pulverized crystal nucleator ingredient obtained in the previous step and a metal aliphatic carboxylate ingredient containing one or two or more kinds of metal aliphatic carboxylates represented by the following general formula (II).

[Chemical Formula 1]

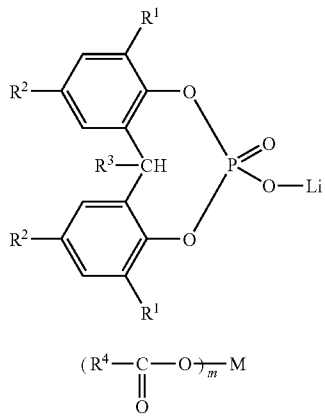

wherein $R^1$ and $R^2$ represent alkyl groups having 1 to 4 carbon atoms; $R^3$ represents a hydrogen atom or an alkyl group having 1 to 4 carbon atoms; $R^4$ represents an aliphatic group having 1 to 30 carbon atoms, optionally having a branch, a hydroxyl group, or a cycloalkyl group; M represents an alkali metal atom or a magnesium atom; m represents 1 when M is an alkali metal atom, and m represents 2 when M is a magnesium atom.

Also, the present invention provides a crystalline polymer composition comprising a crystal nucleator composition obtained by the above-mentioned production process of the present invention.

BRIEF DESCRIPTION OF THE DRAWINGS

FIG. 1 is a chart of an X-ray diffraction peak of a silicone powder (RSRP-43275G; manufactured by Rigaku Corp.) which is a diffraction standard for the X-ray diffraction method.

FIG. 2 is a chart of an X-ray diffraction peak of a crystal nucleator, Compound No. 2 and that of a pulverized crystal nucleator B obtained by pulverizing the crystal nucleator, Compound No. 2 with a medium-stirring type pulverizer (Attritor Model MA30D; manufactured by Mitsui Mining Co., Ltd.) for 1 hour.

BEST MODE FOR CARRYING OUT THE INVENTION

Hereafter, preferred embodiments of the present invention will be described specifically.

The above-mentioned crystal nucleator ingredient contains one or two or more kinds of crystal nucleator compounds represented by the general formula (I) and the above-mentioned metal aliphatic carboxylate ingredient contains one or two or more kinds of metal aliphatic carboxylates represented by the general formula (II).

[Chemical Formula 2]

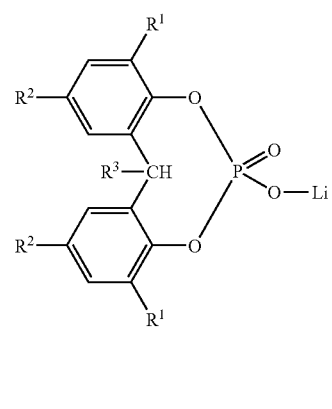

wherein $R^1$ and $R^2$ represent alkyl groups having 1 to 4 carbon atoms; $R^3$ represents a hydrogen atom or an alkyl group having 1 to 4 carbon atoms; $R^4$ represents an aliphatic group having 1 to 30 carbon atoms, optionally having a branch, a hydroxyl group, or a cycloalkyl group; M represents an alkali metal atom or a magnesium atom; m represents 1 when M is an alkali metal atom, and m represents 2 when M is a magnesium atom.

In the general formula (I), as alkyl groups having 1 to 4 carbon atoms represented by $R^1$ and $R^2$, there may be mentioned methyl, ethyl, propyl, isopropyl, butyl, isobutyl, sec-butyl, tert-butyl, and the like. $R^1$ and $R^2$ may be the same or different. As an alkyl group having 1 to 4 carbon atoms represented by $R^3$, the same group as $R^1$ may be mentioned. In addition, $R^1$ and $R^2$ are preferably tert-butyl and $R^3$ is most preferably a hydrogen atom.

As specific examples of the crystal nucleator compound represented by the general formula (I), there may be mentioned the following Compounds No. 1 to No. 6, and the like.

[Chemical Formula 3]

Compound No.1

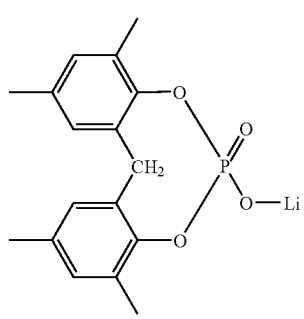

Compound No.2

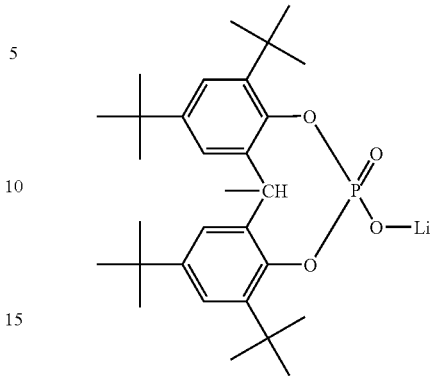

Compound No.3

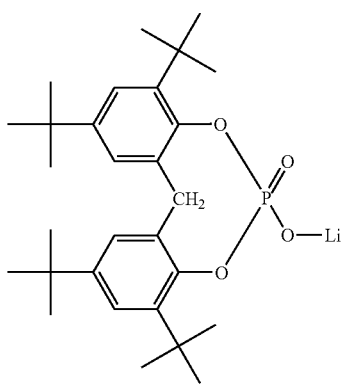

Compound No.4

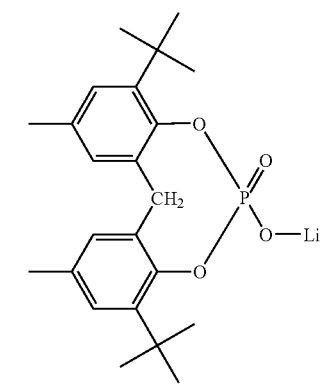

Compound No.5

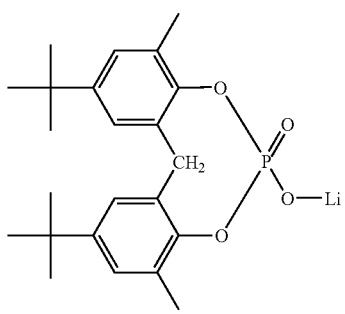

Compound No.6

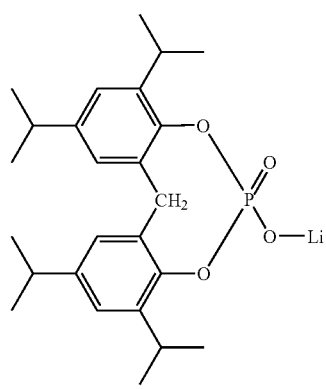

Among the crystal nucleator compounds mentioned above, Compound No. 2 is suitable because it can impart the transparency to the crystalline polymers the most.

In the general formula (II), $R^4$ is an aliphatic group having 1 to 30 carbon atoms, which may have a hydroxyl group or a cycloalkyl group, or may be branched. As an aliphatic carboxylic acid which can give the aliphatic group, there may be mentioned acetic acid, propionic acid, lactic acid, butyric acid, valeric acid, caproic acid, 2-ethylhexanoic acid, enanthic acid, pelargonic acid, caprylic acid, neodecanoic acid, undecanoic acid, lauric acid, tridecanoic acid, myristic acid, pentadecanoic acid, palmitic acid, margaric acid, stearic acid, nonadecanoic acid, arachidic acid, behenic acid, lignoceric acid, cerotinic acid, montanic acid, melissic acid, 4-decenoic acid, lindelic acid, tsuzuic acid, palmitoleic acid, inyristoleic acid, petroselinic acid, oleic acid, elaidic acid, vaccenic acid, linoleic acid, linolelaidic acid, γ-linolenic acid, linolenic acid, ricinoleic acid, naphthenic acid, abietic acid, hydroxyacetic acid, β-hydroxypropionic acid, 2-methyl-β-hydroxypropionic acid, α-hydroxybutyric acid, β-hydroxybutyric acid, γ-hydroxybutyric acid, hydroxymethylpropionic acid, bis(hydroxymethyl)propionic acid, 12-hydroxystearic acid, and the like. Preferable among these are lactic acid, myristic acid, stearic acid, 12-hydroxystearic acid, and the like, because a crystalline polymer composition containing a crystal nucleator composition obtained by compounding these with crystal nucleators represented by the general formula (I) exhibits a significant improvement in transparency. Especially preferable is 12-hydroxystearic acid because it has also an excellent thermal stability.

Furthermore, an alkali metal represented by M in the metal salt includes lithium, potassium, and sodium. Among these, an aliphatic carboxylic acid salt containing lithium as M is preferably used because the crystalline polymer composition containing the crystal nucleator composition compounded with the crystal nucleator represented by the general formula (I) exhibits a significant improvement in transparency.

The first step of the process for producing the crystal nucleator composition is pulverization of the compound represented by the general formula (I) with a dry medium-stirring type pulverizer.

The aforementioned medium-stirring type pulverizer has an inlet for supplying the material to be pulverized into the pulverizing chamber, an outlet for discharging the pulverized material, pulverizing medium, an apparatus to transmit kinetic energy to the pulverizing medium, and a vessel to hold them. The shape of the medium-stirring type pulverizer may be either vertical or horizontal. Also, as the apparatus to transmit kinetic energy to the pulverizing medium, there are mentioned a disc type, a rod type, an annular type, and the like, and any of these may be employed. Furthermore, a jacket may be installed in order to cool the pulverizing chamber as necessary.

Charging of the crystal nucleator ingredient to the medium-stirring type pulverizer may be done with any of batch, recirculating, and continuous methods.

When the medium-stirring type pulverizer is of a continuous type, preferably used is the one having a pipe connecting the pulverizing chamber with a gas cylinder, an air compressor, or an apparatus connected to the gas cylinder and air compressor, which supply through the pipe an inert gas such as nitrogen, argon, helium, and the like, and/or a gas containing air, and having a mechanism wherein the gas conveys continuously the material to be pulverized into the pulverizing chamber and discharges the pulverized material out of the pulverizing chamber, because this type requires less manpower to operate.

When the pulverizer is of a recirculating type, used is the one having a separator installed separately, as necessary, before or behind the outlet for sifting the pulverized material, and having such a mechanism that the coarse particles remained on the separator are returned to the pulverizing chamber to be re-pulverized.

The pulverizing media can be made of various materials, for example, non-metals such as glass, agate, and the like; metals such as alumina and stainless steel; alloys such as tungsten carbide, chrome steel, and the like; ceramics such as zirconia, silicone nitride, steatite, titania, and the like. Among these, preferred are alumina, zirconia, titania, steatite, and the like, because they mostly prevent foreign matter from getting into the obtained powder composition and exhibit excellent pulverizing efficiency.

There are pulverizing media of various shapes such as a spherical, cylindrical, or elliptic one, or one with prongs. Among these, the spherical one is preferable from a viewpoint of less adhesion of the material to be pulverized to the pulverizing media.

The pulverizing media with a diameter of 0.05 mm to 6 cm are commercially available. Furthermore, the pulverizing media are charged into the pulverizing chamber of the medium-stirring type pulverizer, usually up to about 30 to 90% of the effective inner volume by apparent volume. However, the amount of media is not limited to this and can be suitably changed according to the amount of the powdered material to be pulverized.

As examples of a commercially available medium-stirring type pulverizer, there may be mentioned, by a trade name, "Dynamic Mill", "Attritor" (manufactured by Mitsui Mining Co., Ltd.), "Micros" (manufactured by Nara Machinery Co., Ltd.), "Roll Granulator", "Dry Agitating Mill" (manufactured by Kurimoto, Ltd.), "Tower Mill" (manufactured by Eirich GmbH & Co KG), and the like. Any of these may be used suitably, among which "Dry Agitating Mill" is preferably used because of its excellent productivity.

It is known that the finer the particle of the crystal nucleator is, the better the dispersion into the crystalline polymer becomes. In order to obtain the effect of the present invention, it is required that 95% by mass of the crystal nucleator ingredient represented by the general formula (I) is pulverized to a primary particle diameter of 0.8 μm or smaller in the first step.

The crystal nucleator compound is obtained as crystals and exhibits one or two large peaks in a 2θ range from 6.5° to 7.4° in the X-ray diffraction analysis according to the following conditions.

Conditions for X-ray diffraction analysis: X-ray, Cu-Kα; tube voltage/tube current, 40 kV/40 mA; goniometer, horizontal goniometer; monochromator, fixed; attachment, standard sample holder; divergence slit, ½°; divergence vertical limit slit, 10 mm; scattering slit, maximum to 0.73 mm; receiving slit, 0.3 mm; scanning mode, 2 Theta/Theta, scanning type, continuous scanning; scanning speed, 4°/min; sample, 0.1 g placed on a sample plate with a filling space of 20 mm×18 mm×depth 0.5 mm; standard sample, a silicone powder (high-purity, single-crystal silicone was pulverized and sifted to 1 μm or smaller diameter and has an X-ray diffraction peak as shown in FIG. 1).

The relative intensity of X-ray diffraction of the crystal nucleator compound according to the present invention is preferably 0.25 to 0.75, more preferably 0.25 to 0.70, and even more preferably 0.25 to 0.60.

Here, the relative intensity of the X-ray diffraction in the present invention refers to the ratio of an X-ray diffraction peak intensity of a standard sample (the silicon powder which is an X-ray diffraction standard) at Miller indices (111) to the maximum X-ray diffraction intensity of the pulverized crystal nucleator compound in a 2θ range from 6.5° to 7.4°.

A crystal nucleator compound, having a relative intensity of the X-ray diffraction larger than 0.75, does not exhibit the specific transparency-imparting effect. On the other hand, pulverization so that the relative intensity becomes 0.25 or less requires a long period of time and impairs productivity. Thus, pulverization is sufficient when carried out so that the relative intensity of the X-ray diffraction comes into a range from 0.25 or larger to 0.75 or less.

The second step of the process for producing the crystal nucleator composition is to mix and pulverize together the pulverized crystal nucleator compound obtained in the first step and a metal aliphatic carboxylate ingredient represented by the general formula (II).

"To mix and pulverize together" means co-pulverization of the pulverized crystal nucleator compound and the metal aliphatic carboxylate ingredient with a dry pulverizer. And, as a method to mix and pulverize together, the one which imparts frictional and shear forces is preferable. Especially, the aforementioned medium-stirring type pulverizer is preferably used.

As regards the ratio of ingredients of the crystal nucleator composition, with respect to 100 parts by mass of pulverized crystal nucleator ingredient, the metal aliphatic carboxylate ingredient is added in an amount of 5 to 100 parts by mass, preferably 5 to 50 parts by mass, and more preferably 5 to 30 parts by mass.

When the amount of the metal carboxylate ingredient is less than 5 parts by mass, there may be some cases where the aforementioned effect of mixing and pulverization is not obtained, and when the amount exceeds 100 parts by mass, aliphatic carboxylic acid may stick together in the pulverizing vessel.

Furthermore, as long as the effect of the present invention is not impaired, other additives generally used may be added to the crystal nucleator composition as necessary, before the first step or second step of the production process of the present invention, or after production.

As the aforementioned other additives, there may be used antioxidants such as phenolic, phosphorous-based and sulfur-based compounds, and the like; light stabilizers such as HALS, ultraviolet light absorbers, and the like; lubricants such as hydrocarbons, aliphatic acids, aliphatic alcohols, aliphatic esters, aliphatic amide compounds, metal aliphatic carboxylates represented by the general formula (II) or other metal soaps, and the like; heavy metal deactivating agent;

anti-fogging agent; anti-static agents such as cationic surfactants, anionic surfactants, nonionic surfactants, ampholytic surfactants, and the like; halogen-containing compounds; phosphate esters; phosphoric amides; melamine-based compounds; fluorinated resins or metal oxides; flame retardants such as melamine (poly)phosphate, piperazine (poly)phosphate, and the like; fillers such as glass fiber, calcium carbonate, and the like; pigments; inorganic silicate additives such as hydrotalcite, fumed silica, fine particle silica, silica rock, diatomites, clay, kaolin, diatomaceous earth, silica gel, calcium silicate, sericite, kaolinite, flint, feldspar powder, vermiculite, attapulgite, talc, mica, minesotite, pyrophyllite, silica, and the like; crystal nucleators such as dibenzylidene sorbitol, bis(p-methylbenzylidene) sorbitol, bis(p-ethylbenzylidene) sorbitol, disodium bicyclo[2.2.1]heptane-2,3-dicarboxylate, and the like. Especially, phenolic antioxidant and phosphorous-based antioxidant are preferably used because they are effective in preventing the crystalline polymer compounds containing the crystal nucleator composition from coloring.

As will be described later, the metal aliphatic carboxylate represented by the general formula (II) tends to cause troubles of coagulation or the like, when it is present in the first step. Therefore, when it is blended in the first step, the amount for blending has to be very small.

As phenolic antioxidants, there may be mentioned, for example, 2,6-ditert-butyl-p-cresol, 2,6-diphenyl-4-octadecyloxyphenol, stearyl(3,5-ditert-butyl-4-hydroxyphenyl) propionate, distearyl(3,5-ditert-butyl-4-hydroxybenzyl) phosphonate, tridecyl-3,5-ditert-butyl-4-hydroxybenzyl thioacetate, thiodiethylenebis[(3,5-ditert-butyl-4-hydroxyphenyl) propionate], 4,4'-thiobis(6-tert-butyl-m-cresol), 2-octylthio-4,6-di(3,5-ditert-butyl-4-hydroxyphenoxy)-s-triazine, 2,2'-methylenebis(4-methyl-6-tert-butylphenol), bis[3,3-bis(4-hydroxy-3-tertbutylphenyl)butyric acid] glycol ester, 4,4'-butylidenebis(2,6-ditert-butylphenol), 4,4'-butylidenebis(6-tert-butyl-3-methylphenol), 2,2'-ethylidenebis(4,6-ditert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl] terephthalate, 1,3,5-tris(2,6-dimethyl-3-hydroxy-4-tert-butylbenzyl) isocyanurate, 1,3,5-tris(3,5-ditert-butyl-4-hydroxybenzyl) isocyanurate, 1,3,5-tris(3,5-ditert-butyl-4-hydroxybenzyl)-2,4,6-trimethylbenzene, 1,3,5-tris(3,5-ditert-butyl-4-hydroxyphenyl)propionyloxyethyl] isocyanurate, tetrakis[methylene-3-(3',5'-ditert-butyl-4'-hydroxyphenyl)propionate]methane, 2-tert-butyl-4-methyl-6-(2-acryloyloxy-3-tert-butyl-5-methylbenzyl)phenol, 3,9-bis[2-(3-tert-butyl-4-hydroxy-5-methylhydrocinnnamoyloxy)-1,1-dimethylethyl]-2,4,8,10-tetraoxaspiro[5.5]undecane, triethyleneglycol bis[β-(3-tert-butyl-4-hydroxy-5-methylphenyl) propionate], and the like.

As phosphorous-based antioxidants, there may be mentioned, for example, triphenyl phosphite, tris(2,4-ditert-butylphenyl) phosphite, tris(2,5-ditert-butylphenyl) phosphite, tris(nonylphenyl) phosphite, tris(dinonylphenyl) phosphite, tris(mono-,di-mixed nonylphenyl) phosphite, phosphorous acid diphenyl ester, 2,2'-methylenebis(4,6-ditert-butylphenyl)octyl phosphite, diphenyldecyl phosphite, diphenyloctyl phosphite, di(nonylphenyl)pentaerythritol diphosphite, phenyldiisodecyl phosphite, tributyl phosphite, tris(2-ethylhexyl) phosphite, tridecyl phosphite, trilauryl phosphite, phosphorous acid dibutyl ester, phosphorous acid dilauryl ester, trilauryl trithiophosphite, bis(neopentyl glycol)-1,4-cyclohexanedimethyl diphosphite, bis(2,4-ditert-butylphenyl) pentaerythritol diphosphite, bis(2,5-ditert-butylphenyl) pentaerythritol diphosphite, bis(2,6-ditert-butyl-4-methylphenyl)pentaerythritol diphosphite, bis(2,4-dicumylphenyl)pentaerythritol diphosphite, distearylpentaerythritol diphosphite, tetra($C_{12-15}$ mixed alkyl)-4,4'-isopropylidenediphenyl phosphite, bis[2,2'-methylenebis(4,6-diamylphenyl)]isopropylidenediphenyl phosphite, tetra-tridecyl-4,4'-butylidenebis(2-tert-butyl-5-methylphenol) diphosphite, hexa(tridecyl)-1,1,3-tris(2-methyl-5-tert-butyl-4-hydroxyphenyl)butane triphosphite, tetrakis(2,4-ditert-butylphenyl)biphenylene diphosphonite, tris(2-[(2,4,7,9-tetrakis-tert-butyldibenzo[d,f][1,3,2]dioxaphosphepin-6-yl)oxy]ethyl)amine, 9,10-dihydro-9-oxa-10-phosphaphenanthrene-10-oxide, 2-butyl-2-ethylpropanediol-2,4,6-tri-tert-butylphenol monophosphite, and the like.

As sulfur-based antioxidants, there may be mentioned, for example, dialkyl thiodipropionates such as dilauryl-, dimyristyl-, myristylstearyl-, and distearyl esters, and the like; β-alkylmercaptopropionate of polyols such as pentaerythritol tetra(β-dodecylmercaptopropionate) and the like.

As the aforementioned HALS, there may be mentioned the compounds represented by the general formula (III), condensed cyanuric chloride type compounds, polymer type compounds, and the like.

[Chemical Formula 4]

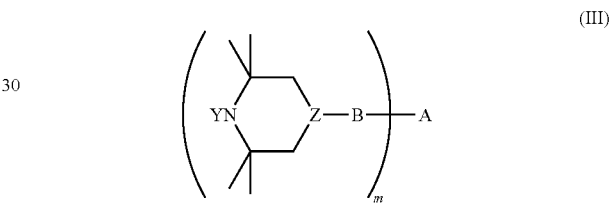

(III)

(In the formula, m is an integer of 1 to 6; A is a hydrogen atom, a m-valent hydrocarbon group having 1 to 18 carbon atoms, a m-valent acyl group, or a m-valent carbamoyl group; B is an oxygen atom, —NH—, or —NRe— in which Re is an alkyl group having 1 to 8 carbon atoms; Y is a hydrogen atom, an oxy radical (.O), an alkoxy group having 1 to 18 carbon atoms, an alkyl group having 1 to 8 carbon atoms, or a hydroxyl group; Z is a methine group, or the following group (IV) which contains an alkyl group, Rf, having 1 to 8 carbon atoms.)

[Chemical Formula 5]

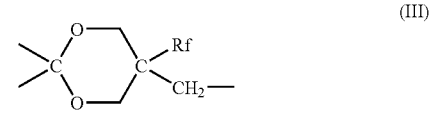

(III)

In the general formula (III), the m-valent hydrocarbon group having 1 to 18 carbon atoms represented by A include such groups as an alkyl group or alkane di- to hexa-yl groups, which are derived from methane, ethane, propane, butane, sec-butane, tert-butane, isobutane, pentane, isopentane, tert-pentane, hexane, cyclohexane, heptane, isoheptane, tert-heptane, n-octane, isooctane, tert-octane, 2-ethylhexane, nonane, isononane, decane, dodecane, tridecane, tetradecane, pentadecane, hexadecane, heptadecane, and octadecane.

The m-valent acyl group represented by A mentioned above, is a group derived from a carboxylic acid, a m-valent carboxylic acid, and a (n-m) alkyl ester of n-valent carboxylic acid with m free carboxyl groups remaining (hereafter, these are referred to as acyl derivative compounds).

As the acyl derivative compounds, there may be mentioned acetic acid, benzoic acid, 4-trifluoromethylbenzoic acid, salicylic acid, acrylic acid, methacrylic acid, oxalic acid, malonic acid, succinic acid, glutaric acid, adipic acid, pimelic acid, suberic acid, azelaic acid, cebacic acid, dodecanedioic acid, 2-methylsuccinic acid, 2-methyladipic acid, 3-methyladipic acid, 3-methylpentanedioic acid, 2-methyloctanedioic acid, 3,8-dimethyldecanedioic acid, 3,7-dimethyldecanedioic acid, hydrogenated dimeric acid, dimeric acid, phthalic acid, terephthalic acid, isophthalic acid, naphthalene dicarboxylic acid, cyclohexane dicarboxylic acid, trimellitic acid, trimesic acid, propane-1,2,3-tricarboxylc acid, propane-1,2,3-tricarboxylic acid mono or dialkyl ester, pentane-1,3,5-tricarboxylic acid, pentane-1,3,5-tricarboxylic acid mono or dialkyl ester, butane-1,2,3,4-tetracarboxylic acid, butane-1,2,3,4-tetracarboxylic acid mono to trialkyl ester, pentane-1,2,3,4,5-pentacarboxylic acid, pentane-1,2,3,4,5-pentacarboxylic acid mono to tetra alkyl ester, hexane-1,2,3,4,5,6-hexacarboxylic acid, hexane-1,2,3,4,5,6-hexacarboxylic acid mono to pentaalkyl ester, and the like.

The m-valent carbamoyl group represented by A mentioned above refers to a monoalkyl carbamoyl group or a dialkyl carbamoyl group derived from an isocyanate compound.

As an isocyanate compound yielding a monoalkyl carbamoyl group, there may be mentioned tolylene diisocyanate, diphenylmethane 4,4'-diisocyanate, p-phenylene diisocyanate, xylylene diisocyanate, 1,5-naphthylene diisocyanate, 3,3'-dimethyldiphenyl 4,4'-diisocyanate, dianisidine diisocyanate, tetramethylxylylene diisocyanate, isophorone diisocyanate, dicyclohexylmethane-4,4'-diisocyanate, trans-1,4-cyclohexyl diisocyanate, norbornene diisocyanate, 1,6-hexamethylene diisocyanate, 2,2,4(2,4,4)-trimethylhexamethylene diisocyanate, lysine diisocyanate, triphenylmethane triisocyanate, 1-methylbenzol 2,4,6-triisocyanate, dimethyltriphenylmethane tetraisocyanate, and the like. As a dialkyl carbamoyl group, there may be mentioned a diethyl carbamoyl group, a dibutyl carbamoyl group, a dihexyl carbamoyl group, a dioctyl carbamoyl group, and the like.

The foregoing groups represented by A may be substituted by a halogen atom, a hydroxyl group, an alkyl group, an alkoxyl group, a nitro group, a cyano group, or the like.

As a $C_{1-8}$ alkyl group represented by Re, which is attached to N contained in B in the general formula (III), there may be mentioned methyl, ethyl, propyl, isopropyl, butyl, sec-butyl, tert-butyl, isobutyl, amyl, isoamyl, tert-amyl, hexyl, cyclohexyl, heptyl, isoheptyl, tert-heptyl, 1-ethylpentyl, n-octyl, isooctyl, tert-octyl, 2-ethylhexyl, and the like.

In the general formula (III), Y is a hydrogen atom, an oxy radical (.O), an alkoxy group having 1 to 18 carbon atoms, an alkyl group having 1 to 8 carbon atoms, or a hydroxyl group.

As the alkoxy group having 1 to 18 carbon atoms, there may be mentioned methoxy, ethoxy, propoxy, isopropoxy, butoxy, sec-butoxy, tert-butoxy, isobutyloxy, amyloxy, isoamyloxy, hexyloxy, heptyloxy, octyloxy, 2-ethylhexyloxy, nonyloxy, isononyloxy, decyloxy, dodecyloxy, tridecyloxy, tetradecyloxy, pentadecyloxy, haxadecyloxy, heptadecyloxy, and octadecyloxy. As an alkyl group having 1 to 8 carbon atoms, the similar groups to Re may be mentioned. As an alkyl group having 1 to 8 carbon atoms, represented by Rf contained in Z in the general formula (IV), there may be mentioned the same groups as Re.

Furthermore, as specific examples of HALS represented by the general formula (III), there may be mentioned, for example, 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl) sebacate, bis(1,2,2,6,6-pentamethyl-4-piperidyl) sebacate, bis(1-octoxy-2,2,6,6-tetramethyl-4-piperidyl) sebacate, 1,2,2,6,6-pentamethyl-4-piperidyl methacrylate, 2,2,6,6-tetramethyl-4-piperidyl methacrylate, tetrakis(2,2,6,6-tetramethyl-4-piperidyl)-1,2,3,4-butanetetracarboxylate, tetrakis (1,2,2,6,6-pentamethyl-4-piperidyl)-1,2,3,4-butanetetracarboxylate, bis(2,2,6,6-tetra-methyl-4-piperidyl)bis(tridecyl)-1,2,3,4-butanetetracarboxylate, bis(1,2,2,6,6-pentamethyl-4-piperidyl)bis(tridecyl)-1,2,3,4-butanetetracarboxylate, bis(1,2,2,6,6-pentamethyl-4-piperidyl)-2-butyl-2-(3,5-ditert-butyl-4-hydroxybenzyl) malonate, 3,9-bis-[1,1-dimethyl-2-[tris(2,2,6,6-tetramethyl-4-piperidyloxycarbonyloxy) butylcarbonyloxy]ethyl]-2,4,8,10-tetraoxaspiro[5,5] undecane, 3,9-bis[1,1-dimethyl-2-[tris(1,2,2,6,6-pentamethyl-4-piperidyloxycarbonyloxy)butylcarbonyloxy] ethyl]-2,4,8,10-tetraoxaspiro[5,5]undecane, and the like.

As HALS of condensed cyanuric chloride type, there may be mentioned 1,6-bis(2,2,6,6-tetramethyl-4-piperidylamino) hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis [2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetra-methyl-4-piperidyl)amino)-s-triazine-6-ylamino] undecane, 1,6,11-tris[2,4-bis(N-butyl-N-(1,2,2,6,6-pentamethyl-4-piperidyl)amino)-s-triazine-6-ylamino] undecane, and the like.

Furthermore, as polymeric types, there may be mentioned 1-(2-hydroxyethyl)-2,2,6,6-tetramethyl-4-piperidinol/diethyl succinate polycondensate, 1,6-bis(2,2,6,6-tetramethyl-4-piperidylamino)hexane/dibromoethane polycondensate, and the like.

As the aforementioned ultraviolet abosorbers, there may be mentioned, for example, 2-hydroxybenzophenones such as 2,4-dihydroxybenzophenone, 2-hydroxy-4-methoxybenzophenone, 2-hydroxy-4-octoxybenzophenone, 5,5'-methylenebis(2-hydroxy-4-methoxybenzophenone), and the like; 2-(2-hydroxyphenyl)benzotriazoles such as 2-(2-hydroxy-5-methylphenyl)benzotriazole, 2-(2-hydroxy-5-tert-octylphenyl)benzotriazole, 2-(2-hydroxy-3,5-ditert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylenebis(4-tert-octyl-6-benzotriazolyl phenol), polyethylene glycol ester of 2-(2-hydroxy-3-tert-butyl-5-carboxyphenyl)benzotriazole, 2-[2-hydroxy-3-(2-acryloyloxyethyl)-5-methylphenyl]benzotriazole, 2-[2-hydroxy-3-(2-methacryloyloxyethyl)-5-tert-butylphenyl]benzotriazole, 2-[2-hydroxy-3-(2-meth-acryloyloxyethyl)-5-tert-octylphenyl]benzotriazole, 2-[2-hydroxy-3-(2-methacryloyl-oxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl]benzotriazole, 2-[2-hydroxy-3-tert-amyl-5-(2-methacryloyloxyethyl)phenyl] benzotriazole, 2-[2-hydroxy-3-tert-butyl-5-(3-methacryloyloxyporopyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl]benzotriazole, 2-[2-hydroxy-4-(3-methacryloyloxypropyl)phenyl]benzotriazole, and the like; 2-(2-hydroxy-phenyl)-4,6-diaryl-1,3,5-triazines such as 2-(2- hydroxy-4-methoxyphenyl)-4,6-diphenyl-1,3,5-triazine, 2-(2-hydroxy-4-hexyloxyphenyl)-4,6-diphenyl-1,3,5-triazine, 2-(2-hydroxy-4-octoxyphenyl)-4,6-bis(2,4-dimethylphenyl)-1,3,5-triazine, 2-(2-hydroxy-4-(3-$C_{12,13}$ mixed alkoxy-2-hydroxypropoxy)phenyl)-4,6-bis(2,4-dimethylphenyl)-1,3,5-triazine, 2-(2-hydroxy-4-(2-acryloyloxyethoxy)phenyl)-4,6-bis(4-methyl-phenyl)-1,3,5-triazine, 2-(2,4-dihydroxy-3-allylphenyl)-4,6-bis(2,4-dimethylphenyl)-1,3,5-triazine, 2,4,6-tris(2-hydroxy-3-methyl-4-hexyloxyphenyl)-1,3,5-triazine, and the like; benzoates such as phenyl salicylate, resorcinol monobenzoate, 2,4-ditert-butylphenyl-3,5-ditert-butyl-4-hydroxybenzoate, octyl(3,5-ditert-butyl-4-hydroxy)benzoate, dodecyl (3,5-ditert-butyl-4-hydroxy)benzoate, tetradecyl (3,5-ditert-butyl-4-hydroxy)benzoate, hexadecyl (3,5-ditert-butyl-4-hydroxy)benzoate, octadecyl (3,5-ditert-butyl-4-hydroxy)benzoate, behenyl (3,5-ditert-butyl-4-hydroxy)benzoate, and the like; substituted oxanilides such as 2-ethyl-2'-ethoxyoxanilide, 2-ethoxy-4'-dodecyloxanilide, and the like; cyanoacrylates such as ethyl α-cyano-β,β-diphenylacrylate, methyl 2-cyano-3-methyl-3-(p-methoxyphenyl)acrylate, and the like; various metal salts or metal chelates, typically such as salts or chelates of nickel or chrome; and the like.

As aliphatic amide compounds used as the aforementioned lubricants, there may be mentioned: monoaliphatic amides such as lauramide, stearamide, oleic amide, erucamide, ricinoleic amide, 12-hydroxystearamide, and the like; N,N'-bisaliphatic amides such as N,N'-ethylenebislauramide, N,N'-methylenebisstearamide, N,N'-ethylenebisstearamide, N,N'-ethylenebisoleic amide, N,N'-ethylenebisbehenic amide, N,N'-ethylenebis-12-hydroxystearamide, N,N'-butylenebisstearamide, N,N'-hexamethylenebisstearamide, N,N'-hexamethylenebisoleic amide, N,N'-xylylene-bisstearamide, and the like; alkylol amides such as monomethylol stearamide, coconut oil monoethanolamide, stearyl diethanolamide, and the like; N-substituted aliphatic amides such as N-oleyl stearamide, N-oleyl oleamide, N-stearyl stearamide, N-stearyl oleamide, N-oleyl palmitamide, N-stearyl erucamide, and the like; N,N'-substituted dicarboxylic amides such as N,N'-dioleyl adipamide, N,N'-distearyl adipamide, N,N'-dioleyl sebacamide, N,N'-distearyl sebacamide, N,N'-distearyl terephthalamide, N,N'-distearyl isophthalamide, and the like. These compounds may be used alone or in combination of two or more kinds.

As crystalline polymers used for the crystalline polymer composition of the present invention, there may be mentioned, for example, polyolefin-based polymers including α-olefin polymers such as low-density polyethylene, linear low-density polyethylene, high-density polyethylene, isotactic polypropylene, sindiotactic polypropylene, hemiisotactic polypropylene, cycloolefin polymer, stereoblock polypropylene, polybutene-1, poly-3-methyl-1-butene, poly-3-methyl-1-pentene, poly-4-methyl-1-pentene, and the like, and x-olefin copolymers such as ethylene/propylene block or random copolymer, and the like; thermoplastic linear polyester-based polymers such as polyethylene terephthalate, polybutylene terephthalate, polyhexamethylene terephthalate, and the like; polysulfide-based polymers such as polyphenylene sulfide and the like; polymers of aliphatic hydroxy carboxilic acid such as polylactic acid, polycaprolactone, and the like; linear polyamide polymers such as polyhexamethylene adipamide and the like; crystalline polystyrene-based polymers such as syndiotactic polystyrene and the like; condensation polymers such as polyimide, polyamide-imide, polyacrylic acid, polymethacrylic acid, nylon, and the like.

Among the crystalline polymers mentioned above, polyolefin-based polymers on which use of the crystal nucleator composition of the present invention exhibits a remarkable effect are suitable. Especially suitable are polypropylene-based resins such as polypropylene, ethylene/propylene block or random copolymer, α-olefin (except ethylene)/propylene block or random copolymer, blends of these polypropylene-based polymers and other α-olefin polymers, and the like.

The amount of adding the crystal nucleator composition obtained according to the process of the present invention is preferably 0.001 to 10 parts by mass, more preferably 0.005 to 10 parts by mass, per 100 parts by mass of the crystalline polymer. With an amount less than 0.001 part by mass, there are some cases that no effect is obtained and with an amount more than 10 parts by mass, no effect of increased amount is obtained, and moreover, the cost becomes higher. Thus, addition of 0.001 to 10 parts by mass is preferable.

Furthermore, the aforementioned other additives used as necessary, may be added to the crystalline polymer by the following methods: a method in which the additives are added to the crystalline polymer, separately from the crystal nucleator composition of the present invention; a method in which the additives are mixed beforehand with the crystal nucleator composition of the present invention, followed by adding the mixture to the crystalline polymer; a method in which the additives are pre-mixed in a desired ratio with the crystal nucleator composition of the present invention together with a pelletizing aid such as a binder, wax, solvent, silica, and the like, which are used as necessary, and pelletized into a one-pack compound additive, and the one-pack compound additive is added to the crystalline polymer; a method in which a masterbatch containing additive components including the crystal nucleator composition obtained according to the production process of the present invention is prepared, followed by adding the masterbatch to the crystalline polymer; and the like.

Especially, phenol- and phosphorus-based antioxidants are suitably used for crystalline polymers because they prevent the coloration of the crystalline polymer composition containing the crystal nucleator composition of the present invention.

As applications of the crystalline polymer composition, there may be mentioned, automotive resin parts such as a bumper, a dashboard, an instrument panel, and the like; resin parts for household appliances such as a refrigerator, a washing machine, a vacuum cleaner, and the like; household articles such as tableware, a bucket, bath items, and the like; resin parts for connection such as a connector and the like; sundry goods such as toys and the like; containers such as a tank, a bottle, and the like; medical packs such as those for dialysis, artificial kidney, and the like; molded goods for medical use such as medical molded goods to fill drug solution (including a syringe barrel), medical molded goods to fill non-drug solution (including a syringe barrel), a syringe, a catheter, a medical tube, a valve, a filter, and the like; construction material such as wall material, floor material, a window frame, wall paper, and the like; wire coating material; agricultural material such as plastic greenhouse, plastic tunnel, and the like; food packaging material such as wrap, a tray, and the like; molded goods for food application such as a container bottle, a straw, a glass, a storage container, and the like; buffer material such as foam insulation, foam buffer material, and the like; fibers for such as mask, shoes cover, gown, sterilized cover, and the like.

The crystalline polymer composition containing the crystal nucleator composition produced by the production process of the present invention are provided for the production of the intended molded goods by known molding methods such as injection molding, extrusion molding, blow molding, injection blow molding, biaxial stretch blow molding, foam molding, inflation molding, calender molding, compression (press) molding, injection compression molding, hollow injection molding, vacuum molding, uniaxial stretching, biaxial stretching, hot rolling, and the like.

The present invention will be further described below based on Examples. However, the present invention is not limited by the following Examples and the like.

In the Examples and Comparative Examples, the primary particle diameter, secondary particle size, X-ray diffraction relative intensity, haze value, and fisheyes were evaluated according to the methods described in the following.

The primary particle diameter refers to a value of the pulverized crystal nucleator compound measured by a dynamic light scattering particle size analyzer (LB-550; manufactured by Horiba Ltd.).

The dispersing solvent used was prepared as follows: 2.0 g of Surfactant A (ADEKA COL EC-4500; manufactured by ADEKA Corp.) and 0.5 g of surfactant B (Lubiscol K-30; manufactured by BASF Corp.) were weighed into a 1000 ml-graduated cylinder, followed by adding 500 ml of distilled water. After dissolving surfactants A and B completely by an ultrasonic irradiation, distilled water was added up to 1000 ml and allowed to cool to room temperature.

To a glass bottle was weighed 20 ml of the dispersing solvent prepared by the above method and to this was gradually added, under stirring by a magnetic stirrer, 40 mg of the crystal nucleator compound (pulverized) and stirred for 10 more minutes to give a dispersion. After removing the stirring bar, the glass bottle was placed on a specified place of the particle size analyzer and the particle size distribution (volume distribution) was measured. From the particle size distribution obtained, the median diameter and the proportion of the particles with a diameter of 0.8 μm or smaller were calculated.

Furthermore, the range of particle size which can be measured by the analyzer used is from 50 to 6000 nm.

The secondary particle size refers to that of the crystal nucleator composition measured by a laser diffraction/scattering particle size distribution analyzer (Microtrack particle size distribution analyzer MT3300; manufactured by Nikkiso Co., Ltd.). Immediately after the production, the crystal nucleator composition was analyzed in dry state for particle size distribution (volume distribution), from which median diameter and 95% particle diameters were calculated.

Here, the median diameter refers to the volume-weighted average diameter on the assumption that the particles are sphere having diameters corresponding to the diameters actually measured.

Furthermore, the 95% particle diameter refers to the diameter as follows. In the histogram of particle diameter distribution, when the cumulative volume counted from the smallest size surpassing 95%, the diameter of the next particle to be cumulated is the 95% particle diameter.

[Measurement of X-ray Diffraction Relative Intensity]

X-ray diffraction analysis of the crystal nucleator compound was performed under the following conditions with a wide angle X-ray diffractometer (Ultima+; manufactured by Rigaku Corp.). The maximum intensity was measured in a 2θ range from 6.5° to 7.4° and its relative intensity to the peak intensity (2θ=28.44°±0.05°) of the standard sample (a silicon powder for an X-ray diffraction angle standard; RSRP-43275G, manufactured by Rigaku Corp.) at Miller indices (111) was calculated.

(Conditions of X-ray Diffraction Measurement)

Conditions of X-ray diffraction analysis: X-ray, Cu-Kα; tube voltage/tube current, 40 kV/40 mA; goniometer, horizontal goniometer; monochromator, fixed; attachment, standard sample holder; divergence slit, ½°; divergence vertical limit slit, 10 mm; scattering slit, maximum to 0.73 mm; receiving slit, 0.3 mm; scanning mode, 2 Theta/Theta; scanning type, continuous scanning; scanning speed, 4°/min; sample, 0.1 g placed on a sample plate with a filling space of 20 mm×18 mm×depth 0.5 mm; standard sample, a silicon powder for an X-ray diffraction angle standard (RSRP-43275G; manufactured by Rigaku Corp.).

[Measurement of Haze Values]

The haze value was measured by Haze-gard II (manufactured by Toyo Seiki Seisaku-sho, Ltd.) according to ISO 14782 at the center of a sheet (60 mm square by 1 mm thick), which was obtained by molding the mixture obtained by adding the crystal nucleator composition to a crystalline polymer under the following processing conditions.

(Processing Condition)

With a Henschel mixer (FM200; manufactured by Mitsui Mining Co., Ltd.), 100 parts by mass of ethylene/propylene random copolymer (ethylene content, 3% by mass; number-average molecular weight, $9.5 \times 10^4$; weight-average molecular weight, $5.8 \times 10^5$) with a melt flow index of 10 g/10 minutes at 230° C. under 21.2 N, 0.1 part by mass of a phenolic antioxidant, tetrakis(methylene-3-(3',5'-ditert-butyl-4'-hydroxyphenyl) propionate]methane, 0.1 part by mass of phosphorous-based antioxidant, tris(2,4-ditert-butylphenyl) phosphite, 0.1 part by mass of calcium stearate, and 0.2 part by mass of a crystal nucleator composition listed in Table 5 were mixed at 1000 rpm for 1 minute. The mixture was pelletized by extruding by an uniaxial extruder (OEX3024; manufactured by DDM, Ltd.) at 250° C., 25 rpm, followed by injection molding the pellet by an injection molding machine (EC100-2A; Toshiba Machine Co., Ltd.) under the conditions wherein, melting the pellet of the polymer composition at an injection temperature of 230° C.; filling the mold with the melted polymer composition under an injection pressure of 50 to 60 MPa for 40 seconds; cooling for 20 seconds in the mold set at 50° C.; and removing the sheet. Thus, a sheet of 60 mm square by 1 mm thick was obtained. Immediately after the injection molding, the sheet was placed in a constant temperature chamber set at 23° C. for 48 hours or more and then subjected to the evaluation.

[Measurement of Fisheyes]

The sheet obtained by the above-mentioned molding process was observed through a loupe to count the number of fisheyes by visual observation and the number of fisheyes per 1 cm² was calculated.

EXAMPLES

Example 1

As the first step, the crystal nucleator, Compound No. 2, was continuously fed at a rate of 25 kg/h by a constant feeder to a medium-stirring type pulverizer (Dry Agitating Mill FK-300, manufactured by Kurimoto, Ltd.), in which a 185 L pulverizing chamber was filled with 200 kg of alumina balls of 2 mm diameters (the volume fraction of balls, 50%) and the crystal nucleator, Compound No. 2, was pulverized under the conditions of a stirring-blade speed of 180 rpm and an average residence time of the material to be pulverized of 14 minutes in the pulverizing chamber to obtain the pulverized crystal nucleator A. Measuring the primary diameter of the pulverized crystal nucleator A, the median diameter was 0.16 μm, and 99% by mass or more of the pulverized crystal nucleator A had a particle diameter of 0.8 μm or smaller. The pulverized crystal nucleator A also showed a relative X-ray diffraction intensity of 0.47.

Then, as the second step, the pulverized crystal nucleator A obtained in the previous step and lithium 12-hydroxystearate were fed at a rate of 25 kg/h and 4.4 kg/h, respectively, to Dry Agitating Mill FK-300 in which a 185 L pulverizing chamber was filled with 150 kg of the same alumina balls as in the first step (the volume fraction of the balls, 37.5%), and were mixed and pulverized together under the conditions of a stirring-blade speed of 150 rpm and an average residence time of 6 minutes to give a crystal nucleator composition No. 1.

Measurement of a secondary particle size of the crystal nucleator composition No. 1 showed a median diameter of 1.17 μm and a 95% particle size of 11 μm.

In the present production process, the crystal nucleator composition was produced continuously by connecting the medium-stirring type pulverizers used in step 1 and that used in step 2. The rate of production was about 29 kg/h, excluding the start-up time.

Here, the average residence time is a value obtained by dividing the mass of the material to be pulverized, which is retained in the pulverizing chamber at the time of pulverization, by a mass of the material to be pulverized, which is fed per unit time to the pulverizing chamber.

Example 2

As the first step, 7 kg of the crystal nucleators Compound No. 2, was fed to a medium-stirring type pulverizer (Attritor MA30D, manufactured by Mitsui Mining Co., Ltd.), in which a 135 L pulverizing chamber was filled with 220 kg of alumina balls of 5 mm diameters (the volume fraction of balls, 75%) as a pulverizing medium and the crystal nucleator, Compound No. 2, was pulverized under the conditions of a stirring-blade speed of 150 rpm until 95% by mass of the primary particles had a primary particle diameter of 0.8 μm or smaller while measuring the primary particle diameter every 10 minutes. As a result, after 1 hour of pulverizing, obtained was a pulverized crystal nucleator B, which shows a median diameter of 0.2 μm and 99% by mass or more of which had a particle diameter of 0.8 μm or smaller, in the measurement of the primary diameter. The pulverized crystal nucleator B also showed a relative X-ray diffraction intensity of 0.52.

Then, as the second step, to the pulverized crystal nucleator B, obtained in the previous step was added 1.23 kg of lithium 12-hydroxystearate and these were mixed and pulverized together by Attritor MA30D under the conditions of a stirring-blade speed of 150 rpm for 10 minutes to give a crystal nucleator composition No. 2.

Measurement of the secondary particle size of the crystal nucleator composition No. 2, showed a median diameter of 2.12 μm and a 95% particle diameter of 88 μm.

In the present production process, it took 130 minutes in total from the first step to the end of production to obtain the crystal nucleator composition, including operations such as discharge of the pulverized material, and thus the rate of production was about 3.8 kg/h.

Comparative Example 1

As the first step, 6 kg of the crystal nucleator, Compound No. 2, was fed to a non-medium-stirring type pulverizer (Vibrating Mill FVR-20, manufactured by Chuo Kakoki Co., Ltd.), in which a 57 L pulverizing vessel was filled with 100 kg of alumina balls of 20 mm diameters (the volume fraction of balls, 80%) as a pulverizing medium, and was pulverized under the conditions of a vibration amplitude of 9.5 mm and a vibration frequency of 20 Hz for 8 hours. However, it was not possible to pulverize to the point where 95% by mass of the pulverized crystal nucleator had a particle diameter of 0.8 μm or smaller. After pulverizing for 8 hours, obtained was a pulverized crystal nucleator C, which had a median diameter of 0.59 μm and 68% by mass of which had a particle diameter of 0.8 μm or smaller, in the measurement of the primary diameter. The pulverized crystal nucleator C also showed a relative X-ray diffraction intensity of 0.63.

Then, as the second step, to the pulverized crystal nucleator, C, obtained in the previous step was added 1.05 kg of lithium 12-hydroxystearate and these were mixed and pulverized together by Vibrating Mill FVR-20 for 10 minutes under the same conditions as the previous step to give Comparative Sample 1. Measurement of the secondary particle size of the Comparative Sample 1 showed a median diameter of 4.9 μm and a 95% particle size of 114 μm.

Comparative Example 2

As the first step, 0.62 kg of the crystal nucleator, Compound No. 2, was fed to a non-medium-stirring type pulverizer (Pot Mill PM-7.3, manufactured by Makino Corp.), in which a 7.3 L pulverizing vessel was filled with 6.5 kg of alumina balls of 5 mm diameters as a pulverizing medium and was pulverized under the conditions of the pulverizing vessel rotating at 70 rpm for 8 hours. However, it was not possible to pulverize to the point where 95% by mass of the pulverized crystal nucleator had a particle diameter of 0.8 μm or smaller. After pulverizing for 8 hours, obtained was a pulverized crystal nucleator D, which had a median diameter of 1.01 μm, and 39% by mass of which had a particle diameter of 0.8 or smaller, in the measurement of the primary diameter. The pulverized crystal nucleator D also had a relative X-ray diffraction intensity of 1.14.

Then, as the second step, to the pulverized crystal nucleator, D, obtained in the previous step was added 0.11 kg of lithium 12-hydroxystearate and these were mixed and pulverized together by Pot Mill PM-7.3 for 10 minutes under the same conditions as the previous step to give Comparative Sample 2. Measurement of the secondary particle size of the Comparative sample 2 showed a median diameter of 14.2 μm and a 95% particle size of 161 μm.

Comparative Example 3

Seven kg of the crystal nucleator, Compound No. 2, and 1.23 kg of lithium 12-hydroxystearate were fed to a medium-stirring type pulverizer (Attritor MA30D, manufactured by Mitsui Mining Co., Ltd.), in which a 135 L pulverizing chamber was filled with 220 kg of alumina balls of 5 mm diameters as a pulverizing medium, and were co-pulverized under the conditions of a stirring-blade speed of 150 rpm for 4 hours. After co-pulverization for 4 hours, although a part of the pulverized material adhere on the bottom of pulverizing chamber, all material including the adhered portion was recovered to give Comparative Sample 3. As regards the Comparative Sample 3, excluding the large grains formed by adhesion, 99% by mass or more of the material had a particle size of 0.8 μm or smaller in the primary particle diameter, and the median diameter was 16 μm and the 95% particle size was 176 μm in the secondary particle size.

In the present production process, it took 5 hours in total to obtain the Comparative Sample 3 including operations such as discharge of the pulverized material, and the rate of production was about 1.65 kg/h.

Comparative Example 4

The present production process corresponds to those described in Examples 1-4 of the Patent Document 5.

To a medium-stirring type pulverizer (Attritor MAID, manufactured by Mitsui Mining Co., Ltd.) were fed 0.28 kg of the crystal nucleator, Compound No. 2, and 0.14 kg of magnesium stearate, and a 5 L pulverizing chamber was filled with 8 kg of alumina balls of 5 mm diameters (the volume fraction of balls, 75%) as a pulverizing medium. Pulverization was conducted under the conditions of a stirring-blade speed of 300 rpm. While stopping the pulverization every 15 minutes in order to disintegrate with spatula etc. the material to be pulverized, which adhered each other, the pulverization was continued for 4 hours to give Comparative Sample 4. A primary particle diameter of 99% by mass or more of Comparative Sample 4 was 0.8 μm or smaller. The time required for pulverization was 4 hours but it took 8 hours including the disintegration work and the like. Thus, the rate of production was about 0.053 kg/h.

Comparative Example 5

The present production process corresponds to those described in Examples 1-2 of Patent Document 5.

To a pulverization vessel was filled with 6 g of the crystal nucleator, Compound No. 2, and after chilling the vessel containing the crystal nucleator with dry ice for 0.5 hour, the chilled pulverization vessel was placed on a non-medium-stirring type pulverizer (HEIKO SAMPLE MILL T1-500ET, manufactured by HEIKO SEISAKUSHO, Ltd.) and pulverization was conducted for 15 minutes to give Comparative Sample 5, 99% by mass or more of which had a primary particle diameter of 0.8 μm or smaller. The time required to produce Comparative Sample 5 was 0.75 hour and, thus, the rate of production was about 0.008 kg/h.

Examples 3-1 to 3-4 and Comparative Example 6

The pulverized crystal nucleator A, obtained in the first step of the production process of Example 1 and the metal aliphatic carboxylate listed in Table 1 were mixed and pulverized together by the medium-stirring type pulverizer (Dry Agitating Mill FK-300), according to the same process as the second step of the production process of Example 1, to give the crystal nucleator compositions No. 3 to No. 6 and Comparative Sample 6 as listed in Table 1.

TABLE 1

| | | Crystal nucleator composition | |
| --- | --- | --- | --- |
| Example | No. | Crystal nucleator ingredient | Metal aliphatic carboxylate |
| Example 3-1 | Crystal nucleator composition No. 3 | Pulverized crystal nucleator A | Lithium lactate |
| Example 3-2 | Crystal nucleator composition No. 4 | Pulverized crystal nucleator A | Lithium stearate |
| Example 3-3 | Crystal nucleator composition No. 5 | Pulverized crystal nucleator A | Lithium myristate |

TABLE 1-continued

| | | Crystal nucleator composition | |
| --- | --- | --- | --- |
| Example | No. | Crystal nucleator ingredient | Metal aliphatic carboxylate |
| Example 3-4 | Crystal nucleator composition No. 6 | Pulverized crystal nucleator A | Magnesium stearate |
| Comparative Example 6 | Comparative Sample 6 | Pulverized crystal nucletor A | Calcium stearate |

Comparative Examples 7-1 and 7-2

Sodium 2,2'-methylene-bis(4,6-ditert-butylphenyl)phosphate (hereafter referred to as "phosphate ester sodium salt") or calcium bis[2,2'-methylene-bis(4,6-ditert-butylphenyl)phosphate] (hereafter referred to as "phosphate ester calcium salt") was pulverized by a medium-stirring type pulverizer (Dry Agitating Mill FK-300) according to the same process as the first step of the production process of Example 1. Then, as the second step, the pulverized material obtained and lithium 12-hydroxystearate were mixed and pulverized together by a medium-stirring type pulverizer (Dry Agitating Mill FK-300) similarly to the production process described in Example 1 to give Comparative Sample 7 and Comparative Sample 8 listed in Table 2.

TABLE 2

| | | Crystal nucleator composition | |
| --- | --- | --- | --- |
| Example | No. | Crystal nucleator ingredient | Metal aliphatic carboxylate |
| Comparative Example 7-1 | Comparative Sample 7 | Phosphate ester sodium salt (pulverized) | Lithium 12-hydroxystearate |
| Comparative Example 7-2 | Comparative Sample 8 | Phosphate ester calcium salt (pulverized) | Lithium 12-hydroxystearate |

Hereafter, the production process of the present invention and the effect of the crystal nucleator composition obtained by the production process will be described in detail.

Reference Example 1

Productivity of the crystal nucleator composition obtained in the pulverization process was evaluated from a value obtained by dividing the produced amount by the amount of pulverizing medium used. The productivities of the crystal nucleator compositions according to the production processes of Examples 1 and 2, and Comparative Examples 3 to 5 are shown in Table 3.

It is noted that, in Example 1, pulverization was carried out continuously by connecting two pulverizers. In contrast, Example 2 and Comparative Examples 3 to 5 were carried out by one pulverizer. The work hour listed in Table 3 represents the time required for operations such as charging the materials to be pulverized and discharging the pulverized material, signifying the time required for production of the crystal nucleator composition except the time spent for pulverization in production.

TABLE 3

| | Pulverizer | Pulverization process | Amount charged (kg) | Pulveriztion time (h) | Work hour (h) | Amount produced (kg/h) | Amount of medium (kg) | Productivity per unit weight of medium (kg/h · kg) |
|---|---|---|---|---|---|---|---|---|
| Example 1 | Dry Agitator Mill FK-300 | Individual pulverization ↓ mixing and pulverization | | | | 29 | 350 | 0.084 |
| Example 2 | Attritor MA30D | Individual pulverization ↓ mixing and pulverization | 8.23 | 1.17 | 1 | 3.8 | 220 | 0.017 |
| Comparative Example 3 | Attritor MA30D | co-pulverization | 8.23 | 4 | 1 | 1.7 | 220 | 0.0075 |
| Comparative Example 4 | Attritor MA1D | co-pulverization | 0.42 | 4 | 4 | 0.053 | 8 | 0.0066 |
| Comparative Example 5 | HEIKO SAMPLE MILL | Individual pulverization | 0.006 | 0.25 | 0.5 | 0.008 | 0.55 | 0.015 |

From Table 3, it is clear that Example 1 which is a production process of the present invention is a process of excellent productivity that is much higher than twice the productivity of Example 2 and Comparative Examples 3 to 5 per unit weight of medium, even though it is a process using two pulverizers connected.

Furthermore, Example 2 has a better productivity per unit weight of medium compared to the processes of Comparative Examples 3 to 5 and shows clearly that the production process of the present invention, which contains two step pulverization using a medium-stirring type pulverizer, has an extremely good productivity.

It is noted that Example 1 is a production process of continuous operation and the produced amount represents the amount at the time of stable production except the start-up time. Furthermore, Comparative Example 5 involves a pulverization of the crystal nucleator compound No. 2 alone, and do not involve the step of mixing and pulverizing together (or co-pulverization) of the crystal nucleator and 12-hydroxystearic acid metal salt, which is carried out in other processes.

Reference Example 2

With using the crystal nucleator composition or pulverized crystal nucleator obtained by the production processes of Examples 1 and 2, and Comparative Examples 1 to 5, 1 mm thick sheets were molded according to the following formulation, and the haze value and number of fisheyes of the sheets were measured. These results are shown in Table 4.

(Formulation)

An ethylene/propylene random copolymer with a melt-flow index of 10 g/10 minutes at 230° C. under 21.2 N (ethylene content, 3% by mass; number average molecular weight, $9.5 \times 10^4$; weight average molecular weight, $5.8 \times 10^5$), 100 parts by mass; as a phenolic antioxidant, tetrakis[methylene-3-(3',5'-ditert-butyl-4'-hydroxyphenyl) propionate] methane, 0.1 part by mass; as a phosphorous-based antioxidant, tris(2,4-ditert-butylphenyl) phosphite, 0.1 part by mass; calcium stearate, 0.1 part by mass; the crystal nucleator composition listed in Table 4, 0.2 part by mass.

TABLE 4

| | Crystal nucleator composition | Pulverizer | Pulverization method | Proportion of primary particle diameter ≦0.8 μm (%) | Secondary particle size Median diameter (μm) | Secondary particle size 95% particle diameter (μm) | Relative X-ray diffraction intensity | Haze value (%) | Fisheyes (number/cm²) |
|---|---|---|---|---|---|---|---|---|---|
| Example 1 | Crystal nucleator composition No. 1 | Medium-stirring type pulverizer (Dry Agitating Mill FK-300) | Individual pulverization ↓ mixing and pulverization | >99 | 1.2 | 11 | 0.47 | 11.3 | <2 |
| Example 2 | Crystal nucleator composition No. 2 | Medium-stirring type pulverizer (Attritor MA30D) | Individual pulverization ↓ mixing and pulverization | >99 | 2.1 | 88 | 0.52 | 11.6 | <5 |
| Comparative Example 1 | Comparative Sample 1 | Non-medium-stirring type pulverizer (Vibrating Mill) | Individual pulverization ↓ mixing and pulverization | 68 | 4.9 | 114 | 0.63 | 13.8 | >15 |

TABLE 4-continued

| | Crystal nucleator composition | Pulverizer | Pulverization method | Proportion of primary particle diameter ≦0.8 μm (%) | Secondary particle size Median diameter (μm) | Secondary particle size 95% particle diameter (μm) | Relative X-ray diffraction intensity | Haze value (%) | Fisheyes (number/cm²) |
|---|---|---|---|---|---|---|---|---|---|
| Comparative Example 2 | Comparative Sample 2 | Non-medium-stirring type pulverizer (Tumbling Mill) | Individual pulverization ↓ mixing and pulverization | 39 | 14.2 | 161 | 1.14 | 16.5 | >15 |
| Comparative Example 3 | Comparative Sample 3 | Medium-stirring type pulverizer (Attritor MA30D) | Co-pulverization | >99 | 16*[1)] | 176*[1)] | 0.26 | 13.3 | >30 |
| Comparative Example 4 | Comparative Sample 4 | Medium-stirring type pulverizer (Attritor MA1D) | Co-pulverization | >99 | 2.5*[1)] | 32*[1)] | 0.23 | 13.5 | >30 |
| Comparative Example 5 | Comparative Sample 5 | Non-medium-stirring type pulverizer (SAMPLE MILL T1-500ET) | Individual pulverization | >99 | 5.6 | 60 | 0.66 | 17.8 | >30 |

*[1)]Measured values of powder obtained by sifting out the adhered material through a 10-mesh sieve.

From Table 4, it is clear that the crystal nucleator composition obtained by the production process containing two step pulverization process using a medium-stirring type pulverizer according to the present invention, in which the pulverized crystal nucleator obtained in step 1 shows a proportion of particles with a primary particle diameter of 0.8 μm or smaller being at least 95% by mass or more and a relative X-ray diffraction intensity in the range of 0.25 to 0.75, exhibits an excellent transparency-imparting effect and shows a specifically small number of fisheyes.

Also, it is clear from Comparative Examples 3, 4, and 5, that the production processes other than that of the present invention show a large number of fisheyes.

Reference Example 3

Haze values were measured for the sheets of 1 mm thickness, which were prepared according to the same formulation and processing method as those of Reference Example 2, using the crystal nucleator compositions No. 1, No. 3 to No. 6, and Comparative Sample 6 which were obtained from Example 1, Examples 3-1 to 3-4, Example 4, and Comparative Example 6, respectively. The results are shown in Table 5.

It is noted that, in Reference Example 3-7 listed in Table 5, 0.2 part by mass of pulverized crystal nucleator A, was added as the crystal nucleator composition when preparing a sheet of 1 mm thickness for evaluation. In the reference example 3-8, the haze value was measured for the sheet of 1 mm thickness which was prepared without addition of the crystal nucleator composition.

TABLE 5

| | Crystal nucleator composition | Crystal nucleator ingredient | Metal aliphatic carboxylate | Haze value (%) | Fisheyes (number/cm²) |
|---|---|---|---|---|---|
| Reference Example 3-1 | Crystal nucleator composition No. 1 | Pulverized crystal nucleator A | Lithium 12-hydroxystearate | 11.3 | <2 |
| Reference Example 3-2 | Crystal nucleator composition No. 3 | Pulverized crystal nucleator A | Lithium lactate | 11.8 | <2 |
| Reference Example 3-3 | Crystal nucleator composition No. 4 | Pulverized crystal nucleator A | Lithium stearate | 12.2 | <2 |
| Reference Example 3-4 | Crystal nucleator composition No. 5 | Pulverized crystal nucleator A | Lithium myristate | 12.4 | <2 |
| Reference Example 3-5 | Crystal nucleator composition No. 6 | Pulverized crystal nucleator A | Magnesium stearate | 13.2 | <5 |
| Reference Example 3-6 | Comparative Sample 6 | Pulverized crystal nucleator A | Calcium stearate | 14.0 | >15 |
| Reference Example 3-7 | Pulverized crystal nucleator A | Pulverized crystal nucleator A | None | 17.8 | >30 |
| Reference Example 3-8 | None | None | None | 33.7 | >30 |

It is clear from Table 5 that the crystal nucleating composition obtained by mixing and pulverizing together, as the second step of production, the pulverized crystal nucleator A and metal aliphatic carboxylates in which the metal is an alkali metal atom or a magnesium atom, shows a good transparency-imparting effect and less formation of fisheyes. Especially, the crystal nucleator composition containing lithium 12-hydroxystearate as the metal aliphatic carboxylate shows an excellent effect.

Reference Example 4

Haze values were measured for the sheets of 1 mm thickness, which were prepared according to the same formulation and processing method as those of Reference Example 2, using the crystal nucleator composition No. 1 obtained in Example 1 and Comparative Sample 7 and Comparative Sample 8 obtained from Comparative Examples 7-1 and 7-2. The results are shown in Table 6.

TABLE 6

|  | Crystal nucleator composition | Crystal nucleator ingredient | Metal aliphatic carboxylate | Haze value (%) | Fisheyes (number/cm$^2$) |
| --- | --- | --- | --- | --- | --- |
| Reference Example 4-1 | Crystal nucleator composition No. 1 | Pulverized crystal nucleator A | Lithium 12-hydroxystearate | 11.3 | <2 |
| Reference Example 4-2 | Comparative Sample 7 | Phosphate ester Na salt (pulverized) | Lithium 12-Hydroxystearate | 24.7 | >15 |
| Reference Example 4-3 | Comparative Sample 8 | Phosphate ester Ca salt (pulverized) | Lithium 12-Hydroxystearate | 25.1 | >30 |

It is clear from Table 6 that only the crystal nucleator composition obtained by mixing and pulverizing together a pulverized crystal nucleator compound, which is a lithium salt represented by the aforementioned general formula (I), with a metal aliphatic carboxylate, shows an excellent transparency-imparting effect and a specifically small number of fisheyes. Thus, it is assumed that the pulverization process of the present invention provides some compounding effect which is different from a simple mixing.

As described above, the present invention provides a process for producing a crystal nucleator composition with extremely high productivity, in which the crystal nucleator compound represented by the aforementioned general formula (I) and a metal aliphatic carboxylate is compounded, and also provides a crystalline polymer composition, which contains the crystal nucleator composition obtained and a crystalline polymer and shows an improved transparency and reduced fisheyes.

INDUSTRIAL APPLICABILITY

The present invention provides a process for producing a crystal nucleator composition with high productivity, which has a sufficient transparency-imparting effect, and also provides a crystalline polymer composition which contains the crystal nucleator composition obtained and shows an improved transparency and reduced fisheyes.

The invention claimed is:

1. A process for producing a crystal nucleator composition comprising:

a first step pulverizing 95% by mass or more of a crystal nucleator ingredient containing one or two or more kinds of compounds represented by the following general formula (I) to a primary particle diameter of 0.8 μm or smaller with a dry medium-stirring type pulverizer; and a second step mixing and pulverizing the pulverized crystal nucleator ingredient obtained in the previous step and a metal aliphatic carboxylate ingredient containing one or two or more kinds of metal aliphatic carboxylates represented by the following general formula (II):

[Formula 1]

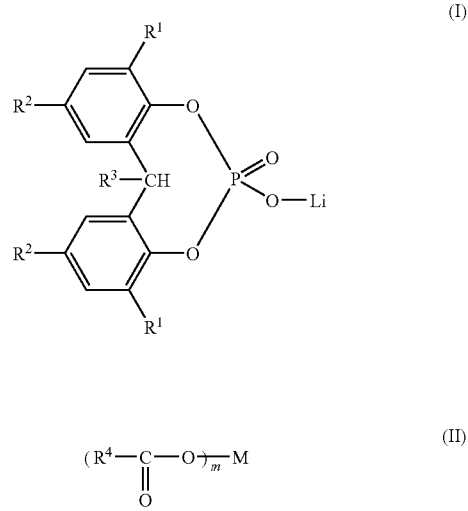

wherein $R^1$ and $R^2$ represent alkyl groups having 1 to 4 carbon atoms; $R^3$ represents a hydrogen atom or an alkyl group having 1 to 4 carbon atoms; $R^4$ represents an aliphatic group having 1 to 30 carbon atoms, optionally having a branch, a hydroxyl group, or a cycloalkyl group; M represents an alkali metal atom or a magnesium atom; m represents 1 when M is an alkali metal atom, and m represents 2 when M is a magnesium atom.

2. The process for producing a crystal nucleator composition according to claim 1, wherein the medium-stirring type pulverizer has an inlet for supplying a material to be pulverized into the pulverizing chamber and an outlet for discharging the pulverized material separately and pulverizes in continuous operation.

3. The process for producing a crystal nucleator composition according to claim 1, wherein $R^1$ and $R^2$ are tert-butyl groups and $R^3$ is a hydrogen atom in the compound represented by the general formula (I).

4. The process for producing a crystal nucleator composition according to claim 1, wherein M of the metal aliphatic carboxylate represented by the general formula (II) is a lithium atom.

5. The process for producing a crystal nucleator composition according to claim 1, wherein $R^4$ of the metal aliphatic carboxylate represented by the general formula (II) has a hydroxyl group.

6. The process for producing a crystal nucleator composition according to claim 1, wherein the metal aliphatic carboxylate represented by the general formula (II) is a lithium 12-hydroxystearate.

7. The process for producing according to claim 1, wherein $R^1$ and $R^2$ are tert-butyl groups and $R^3$ is a hydrogen atom in the compound represented by the general formula (I), the metal aliphatic carboxylate represented by the general formula (II) is a lithium 12-hydroxystearate, and the medium-stirring type pulverizer has an inlet for supplying a material to be pulverized into the pulverizing chamber and an outlet for discharging the pulverized material separately and pulverizes in continuous operation.

8. The process for producing a crystal nucleator composition according to claim 1, wherein the crystal nucleator ingredient pulverized by the medium-stirring type pulverizer has a value of the relative intensity ranging from 0.25 to 0.75, the relative intensity being that of the maximum X-ray diffraction intensity in a 2θ range of 6.5° to 7.4° in the X-ray diffraction analysis under the following conditions:

X-ray, Cu-Kα; tube voltage/tube current, 40 kV/40 mA; goniometer, horizontal goniometer; monochromator, fixed; attachment, standard sample holder; divergence slit, ½°; divergence vertical limit slit, 10 mm; scattering slit, maximum to 0.73 mm; receiving slit, 0.3 mm; scanning mode, 2 Theta/Theta; scanning type, continuous scanning; scanning speed, 4°/min; sample, 0.1 g placed on a sample plate with a filling space of 20 mm×18 mm×depth 0.5 mm; and standard sample comprising a silicone powder obtained by pulverizing and sifting a high-purity, single-crystal silicone to 1 μm or smaller of diameter and having an X-ray diffraction peak of 2θ=28.44°+/−0.05°.

9. The process for producing a crystal nucleator composition according to claim 1, wherein 5 to 100 parts by mass of a metal aliphatic carboxylate ingredient containing one or two or more kinds of metal aliphatic carboxylates represented by the general formula (II) are used per 100 parts by mass of the pulverized crystal nucleator ingredient to be used in the second step.

10. A crystalline polymer composition comprising a crystal nucleator composition obtained by the production process according to claim 1.

11. The crystalline polymer composition according to claim 10 comprising 0.001 to 10 parts by mass of the crystal nucleator composition per 100 parts by mass of the crystalline polymer.

12. The crystalline polymer composition according to claim 11, wherein the crystalline polymer is a polyolefin-based polymer.

13. The crystalline polymer composition according to claim 12, wherein the polyolefin-based polymer is a polypropylene-based resin.

14. The crystalline polymer composition according to claim 10 comprising a phenolic antioxidant.

15. The crystalline polymer composition according to claim 10 comprising a phosphorous-based antioxidant.

16. The crystalline polymer composition according to claim 11 comprising a phenolic antioxidant.

17. The crystalline polymer composition according to claim 12 comprising a phenolic antioxidant.

18. The crystalline polymer composition according to claim 13 comprising a phenolic antioxidant.

19. The crystalline polymer composition according to claim 11 comprising a phosphorous-based antioxidant.

20. The crystalline polymer composition according to claim 12 comprising a phosphorous-based antioxidant.

* * * * *